July 24, 1962  L. L. GAUBIS ET AL  3,045,762
PROPELLER SPINNER SHUTOFF VALVE
Filed Oct. 26, 1960  2 Sheets-Sheet 1

INVENTORS
DONALD G. HALL
LEONARD L. GAUBIS
BY Leonard F. Weblind
ATTORNEY

July 24, 1962   L. L. GAUBIS ET AL   3,045,762
PROPELLER SPINNER SHUTOFF VALVE
Filed Oct. 26, 1960   2 Sheets-Sheet 2

INVENTORS
DONALD G. HALL
LEONARD L. GAUBIS
BY *Leonard F. Wacklind*
ATTORNEY

United States Patent Office 3,045,762
Patented July 24, 1962

3,045,762
PROPELLER SPINNER SHUTOFF VALVE
Leonard L. Gaubis, East Granby, and Donald G. Hall, Suffield, Conn., assignors to United Aircraft Corporation, East Hartford, Conn., a corporation of Delaware
Filed Oct. 26, 1960, Ser. No. 65,184
7 Claims. (Cl. 170—135.743)

This invention relates to a spinner assembly for an aeronautical propeller and more particularly to valve shutoff means for preventing air flow within the spinner.

It is an object of this invention to provide a centrifugally actuated valve mechanism for automatically moving in opening and closing positions for controlling ram air flow through a spinner.

Since the advent of the turbine type of power plant having propeller installations, it has been generally recognized that forced air-cooling of the propeller working mechanism was a necessary incident. To this end, spinner assemblies have been provided to envelop the propeller and provide means for forced air-cooling. It was further recognized that the admittance of air within the spinner increased the fire hazards attendant during a malfunction of the engine. Industry has seen several attempts directed toward shutting off the air flow passing through the spinner when the pitch of the blade reached a predetermined angle and such devices have been known to require valve mechanism mechanically connected to the propeller blade. Because of these mechanical connections and types of valve mechanisms heretofore utilized, such devices have proven to be relatively complex, large in size, and as a consequence increase the overall weight of the propeller. Of course, additional weight creates penalties in terms of aircraft performance and wherever possible weight-saving devices are utilized since any realization of reduction in weight precludes these penalties and accordingly is considered to be a major contribution to the art. For obvious reasons, simplification for accomplishing ram air shutoff will further afford additional advantages; namely, in operation, manufacture, assembly, and cost. As a result of this invention, all these advantages are realized; namely, reduction in weight and size, simplicity of construction and manufacture, ease of assembly, reliability, and accuracy and reduction in cost. In this novel arrangement, the shutoff valve is mounted within the spinner in the air conducting passage defined by the spinner shell and the propeller hub and dome assemblies and operates automatically as a function of the revolutions per minute (r.p.m.) of the propeller and independently of the position or pitch of the propeller blade. Flyweights are mounted on the valve so that the centrifugal force acting on the valve which is caused by the rotation of the propeller urges the valve open. A spring, associated with the valve, counteracts this force for urging it in the closed direction in such a manner that the net difference between the two forces determines at which propeller speed the valve begins to open. Thus, during a malfunction, if the blades are put in their feather condition, which is the condition when the cord line of the blades is parallel to the air stream so as to provide the least amount of drag, the speed of the propeller will decrease and, as a result, centrifugal force decreases and the spring automatically causes the valve to move to the close position and hence prevents the passage of air to the aft portion of the spinner. Further, in propellers which contain braking mechanism, actuation of the brake will result in a reduction of propeller r.p.m. and obviously the shutoff valve responding to the decrease in propeller r.p.m. will close automatically. Thus the flow of ram air is regulated as a function of the rotational speed of the propeller regardless of the pitch of the propeller blades.

Other objects and advantages will be apparent from the specification and claims, and from the accompanying drawings which illustrate an embodiment of the invention.

Figure 1:
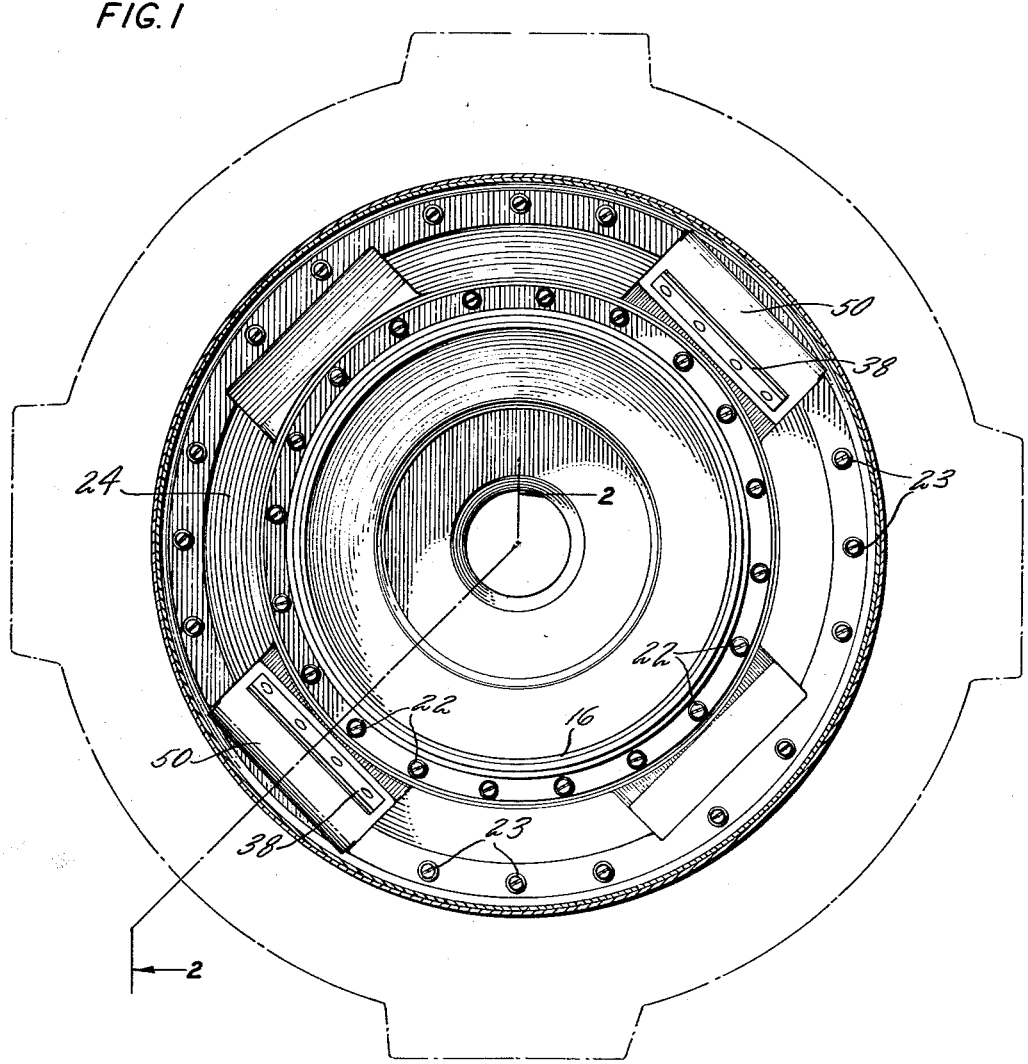
FIG. 1 is a plan end view of the nose section of the spinner assembly.
Figure 2:
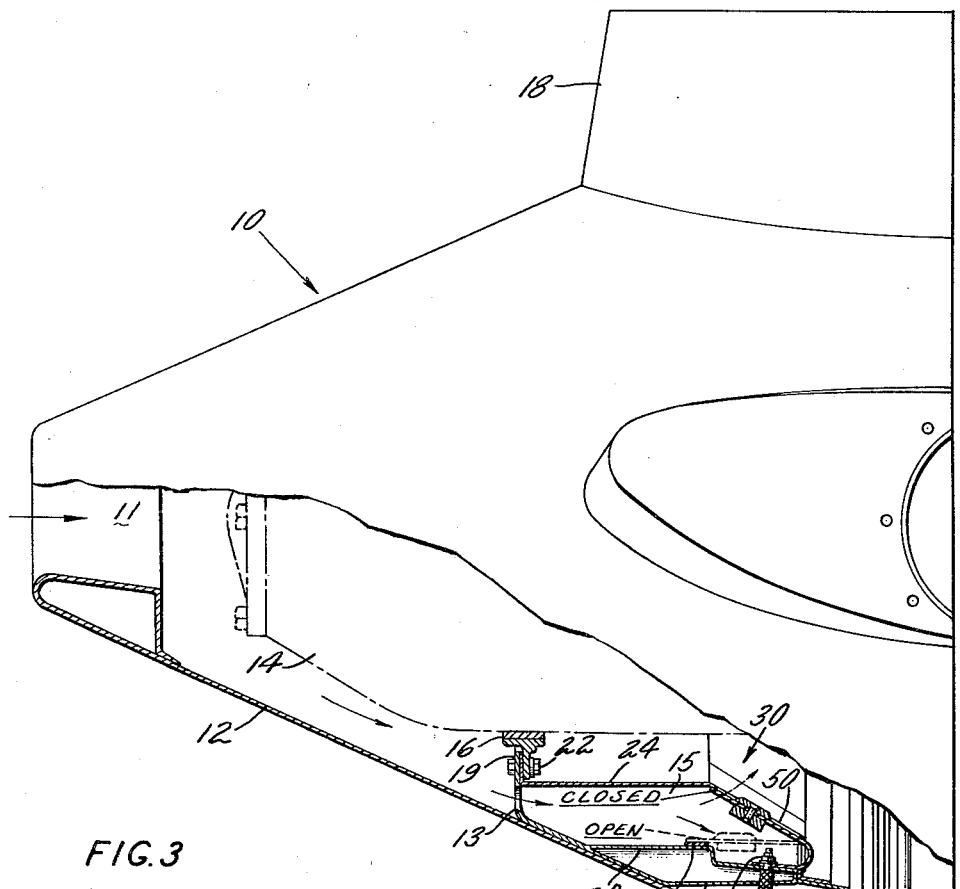
FIG. 2 is a fragmentary view partly in section and partly in elevation taken along line 2—2 of FIG. 1.

Referring particularly to FIGS. 1 and 2, numeral 10 refers generally to a nose section of the spinner having a shell 12 which is streamlined and faired in a generally frusto conically shape terminating at its reduced diameter into an aperture 11.

The aperture 11 serves as an inlet for admitting ram air in the inner portion of the spinner. In the preferred embodiment, the spinner is generally formed by two sections, the nose and the aft body. For convenience the aft-body section is not shown. This spinner is generally similar to the spinner assembly shown in Patent No. 2,928,475, of T. E. Doherty et al. and for further details reference should be made thereto. The spinner envelops the propeller and is supported to the hub for rotation therewith by a rear bulkhead, not shown. The dome 14 is secured to the hub extending forward therefrom and is encased within the spinner nose section. The forward bulkhead 16 engages the outer peripheral surface of the dome intermediate to its ends and serves to support the shell and also provides a seal between the fore and aft ends of the dome at its point of contact. The spinner contains a plurality of equally spaced cavity portions around its circumference which receive the propeller blades extending radially from the hub. A streamline portion or platform 18 extends radially from the spinner for contouring the area where the blade changes from its airfoil section to its shank section. An elongated support member having a body portion 20 may be bonded or secured to the shell of the spinner and has at its left end a flange 19 which engages bulkhead 16. An annular baffle plate 24 engages at its left end to support member and the bulkhead engaging both the support member and baffle plate and all are secured together by nut and bolt assembly 22. The annular baffle plate extends rearwardly toward the blade centerline and engages the support member and may be secured thereto by nut and bolt assembly 23. A plurality of apertures or openings 13 are circumferentially spaced along the flange of support 20 and provide communication with the ram air admitted through the aperture 11 and annular chamber 15 defined in the spinner by support member 20 and baffle 24. As can be seen in FIG. 1, the baffle plate is secured at its forward end to the support member 20 around the entire circumference by a plurality of securing nut and bolt assemblies 22. A number of openings may be provided in the baffle which serves to conduct air downstream thereof toward the aft portion of the spinner.

In accordance with this invention, a centrifugally operated valve generally indicated by numeral 30 cooperates with this opening for automatically opening and closing for controlling the flow of ram air in the manner to be described immediately hereinbelow. The valve may be secured to the supporting member by a stud 32 and nut 34. The valve body is formed by a generally V-shaped member 50 having in one of its legs a flat body portion overlying the opening in baffle 24. The V-shaped member 50 may be formed from a resilient material which serves to spring load the valve in a closed position. The flyweight 38 may be secured to the valve body in any suitable manner for producing a force (due to propeller rotation) which opposes the spring load for urging the valve in its open position. Thus it can be seen that in flight, ram air will be admitted through aperture 11 and directing the flow inwardly through passage 13 and into baffle chamber 15. If the speed of rotation of the propeller is sufficient so that the centrifugal force acting on the valve body overcomes the force exerted by the resilient member, the valve will open permitting ram air to ingress to the aft portion of the spinner (as shown in phantom.) The ram air may be utilized to cool the hydraulic fluids within the propeller and further utilized to cool controls and accessories as desired. In the event of a malfunction, the blades would normally be feathered for reducing the r.p.m. of the propeller and as a result, the spring force overcomes the centrifugal force acting on the valve member urging the valve to the closed position and hence prevents ram air from going beyond the baffle chamber 15. Of course, a number of shutoff valves and passages may be provided depending on the air weight flow desired. A pad element 40 may be secured to the support member and engages the left end of the valve body for absorbing its impact force.

From the foregoing it is apparent that since the centrifugal force can be readily predictable by selecting the proper spring rate constant and flyweights size, it is therefore possible to calculate the proper combination for determining at which r.p.m. of the propeller the valve will open.

Figure 3:
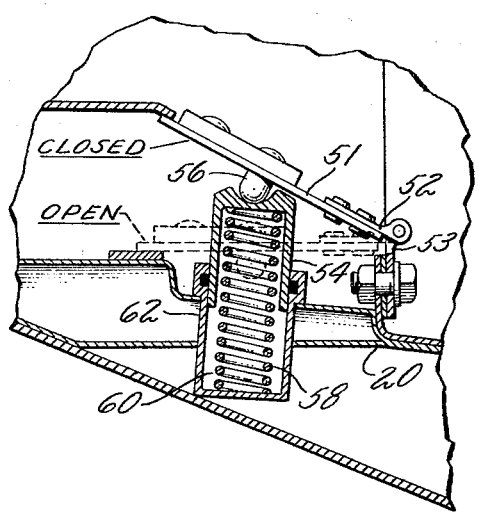
FIG. 3 is a fragmentary sectional view showing another embodiment of the shutoff valve arrangement.

FIG. 3 depicts another valve arrangement which is centrifugally actuated and comprised of a valve body 51, a hinge member having one leg 52 secured to the valve body and the other leg 53 secured to support member 20. Spring bias piston 54 abuts against projection 56 which extends radially from valve body 51. The spring piston urges the valve in its closed position, and is actuated by spring 58 which is housed in the cylinder chamber 60 of the cylinder housing 62. The cylinder housing may be secured in any suitable manner to support member 20. This arrangement functions identically to the integral spring and valve assembly described above.

What has been described is a centrifugally operated shutoff valve for preventing ram air flow at a predetermined r.p.m. of the propeller. The valve is characterized by being relatively simple, inexpensive, easily manufactured and highly reliable.

It is to be understood that the invention is not limited to the specific embodiment herein illustrated and described but may be used in other ways without departure from its spirit as defined by the following claims.

We claim:

1. In a spinner assembly for a variable pitch propeller, a hub, a shell secured to and spaced from the hub for rotational movement therewith, both the hub and shell defining an annular air passage, an obstruction mounted in the shell having an opening, air shut off means cooperating with said opening for controlling the air flow through the spinner including a centrifugally actuated device.

2. A propeller spinner, means for regulating the flow of ram air through the inner portion of said spinner comprising a wall-like member defining an obstruction for preventing airflow from passing rearwardly from the forward end of the spinner to the rearward end, an adjustable valve carried by said wall-like member and means responsive to the rotation of the spinner for varying the opening of said valve.

3. A propeller spinner as defined in claim 2 wherein said valve comprises a main body portion, and a flyweight secured to said portion.

4. For an aeronautical propeller having a hub, a spinner assembly secured to and enclosing the hub and defining an airflow passage, an obstruction forming a wall extending transversely of the air passage and also having a body portion extending axially toward the hub, said body portion having at least one cavity for directing air from the upstream side of the passage toward the downstream side of said passage, shutoff means associated with said cavity for blocking off the flow of air in the passage including a centrifugally actuated valve movable transversely with respect to the axis of the spinner and resilient means operatively connected to the valve for normally urging the valve closed.

5. In a spinner assembly for an aeronautical propeller having variable pitch blades, the spinner having a generally conically shaped shell defining an air passage, a support mounted on the inner diameter of the shell and extending inwardly toward the propeller axis, said support having a rearwardly extending body portion having an aperture, vlave means mounted on said body portion for varying the opening of the aperture, said valve means comprising a main body portion overlying said aperture, a weighted element secured to said main body portion and responsive to the rotation of the spinner assembly for producing a force for urging the main body in one direction, spring means cooperating with said valve body for urging said body in an opposite direction.

6. In a spinner assembly for an aeronautical propeller having a hub and dome, a shell-like member encasing both the hub and dome and tapering forwardly of the dome, said hub, dome and shell defining an air passage communicating with an air entrance formed in the reduced portion of the shell for directing ram air inwardly toward the rear end of the spinner, a support member extending transversely of said passage and terminating into an annular ring-like element, said ring element engaging the outer periphery of the dome in sealing relation, said support member having an elongated channel member projecting rearwardly toward the rear or enlarged portion of the spinner, an elongated enclosure member coaxially secured to the support member, said elongated member and support member together forming a wall for defining an annular air chamber wherein the ram air is admitted to the chamber through at least one opening formed in said support member, adjustable valve means mounted on the wall and defining an opening for directing ram air rearwardly of said chamber, means responsive to the rotation of said shell-like member about the spinning axis for varying the opening of said adjustable means.

7. Air shutoff means for a propeller spinner comprising a generally cconically shaped hollow shell, an annular support member supported on the inner diameter of the shell intermediate the ends thereof and carrying a perforated upstanding portion at its forward end, an annular baffle member spaced from and concentric to the support member wherein the baffle member and support member together form a generally tubular wall for defining an annular chamber, valve means secured to the wall of the chamber cooperating with an opening formed in the wall located away from said perforations, said valve means comprising a substantially rectangular body member, a hinge support having one leg attached to the body member and a second leg secured to the support member, a weighted element mounted in juxtaposition to the body member, resilient means acting on the valve body for urging the valve closed, said weighted element responsive to the speed of rotation of th hollow shell for urging the valve open.

References Cited in the file of this patent

UNITED STATES PATENTS

| | | |
|---|---|---|
| 2,607,430 | Dean | Aug. 19, 1952 |
| 2,855,056 | Hirsch et al. | Oct. 7, 1958 |
| 2,928,477 | Lambeck | Mar. 15, 1960 |